United States Patent Office 3,488,715
Patented Jan. 6, 1970

3,488,715
LAMINATED GLASS STRUCTURES AND
METHOD THEREFOR
Bobby Leroy Atkins, Lake Jackson, Tex., assignor to The Dow Chemical Company, Midland, Mich., a corporation of Delaware
No Drawing. Filed Sept. 14, 1966, Ser. No. 579,206
Int. Cl. B32b 17/10; C09j 7/00; C03c 27/12
U.S. Cl. 161—203
7 Claims

ABSTRACT OF THE DISCLOSURE

The present invention relates to a method for producing a laminated product and the laminated product comprising a plurality of solid glass sheets adhered together through an interlayer of an irradiated, heat shrinkable, thermoplastic materal, said interlayer comprising a copolymer or ethylene and from about one to about 45 percent by weight of at least one monovinylidene monomer selected from the group consisting of vinyl esters of lower alkanoic monobasic acids, lower alkyl esters of alpha, beta-ethylenically unsaturated monocarboxylic acids, and alpha,beta-ethylenically unsaturated monocarboxylic acids.

---

The present invention relates to laminated glass structures and, more particularly, it relates to such structures employing, as an interlayer, a layer of an irradiated, heat shrinkable, thermoplastic material.

Laminated glass generally consists of a "sandwich" of an interlayer of transparent material between two sheets of common glass, the interlayer material acting also as a cement, or being fixed to the glass by a separate cementing medium. It is this interlayer which prevents the glass from splintering when fractured. A good interlayer material should be hard, tough, sufficiently elastic to draw back splintered glass, generally transparent, and colorless. It should conserve these properties so long as the material is in use and over a reasonable range of temperatures.

Laminated glass structures are currently made by employing a relatively thick layer of thermoplastic material as the interlayer in order to prevent splintering of the glass and also to prevent the formation of air bubbles in the area between the glass and thermoplastic material. Such thermoplastic materials are generally produced by molding or casting films suitable for such use; however, such methods are expensive and, since relatively thick layers of material must be employed to obtain satisfactory properties, the resulting product becomes quite expensive. Therefore, it would be highly desirable to have a laminated glass structure having a thinner interlayer material and which would be less expensive than those structures presently being produced.

According to the present invention, improved laminated glass structures are obtained in a structure comprising at least two sheets of glass adhered to an interlayer of irradiated, heat shrinkable, thermoplastic material as hereinafter delineated.

The particular thermoplastic material which is employed in the invention is an irradiated, heat shrinkable, thermoplastic material such as a film having from about 30 percent to about 90 percent area shrink. The term "area shrink" is used herein to describe those heat shrinkable films that will shrink to a size of from about 30 percent to about 90 percent of its total original size. Polymeric materials that may be preferably employed in the invention include copolymers of ethylene with from about 1 to about 45, preferably from about 3 to about 20, percent by weight of at least one monovinylidene monomer selected from the group consisting of vinyl esters of lower alkanoic monobasic acids, substituted acrylonitriles, lower alkyl esters of $\alpha,\beta$-ethylenically unsaturated monocarboxylic acids, and $\alpha,\beta$-ethylenically unsaturated monocarboxylic acids. Films made from the above described polymeric materials are irradiated with a dose of ionizing radiation, biaxially oriented at elevated temperatures and pressures, preferably by the blown bubble method, and subsequently cooled to obtain films with desirable shrink properties. Examples of suitable monovinylidene monomers are vinyl formate, vinyl acetate, vinyl n-propionate, vinyl isopropionate, vinyl n-butyrate, vinyl isobutyrate, vinyl valerate, vinyl isovalerate, methyl acrylate, ethyl acrylate, n-propyl acrylate, isopropyl acrylate, n-butyl acrylate, isobutyl acrylate, tert.-butyl acrylate, methyl methacrylate, ethyl methacrylate, propyl methacrylate, butyl methacrylate, isobutyl methacrylate, ethyl $\alpha$-ethylacrylate, butyl $\alpha$-ethylacrylate, methyl $\alpha$-propylacrylate, propyl $\alpha$-propylacrylate, ethyl $\alpha$-n-butylacrylate, propyl $\alpha$-isobutylacrylate, acrylic acid, methacrylic acid, $\alpha$-ethylacrylic acid, $\alpha$-propylacrylic acid, $\alpha$-butylacrylic acid, $\alpha$-isobutylacrylic acid, $\alpha$-t-butylacrylic acid, acrylonitrile, methacrylonitrile, $\alpha$-ethylacrylonitrile, $\alpha$-butylacrylonitrile, $\alpha$-isobutylacrylonitrile, $\alpha$-t-butylacrylonitrile, $\alpha$-propylacrylonitrile and $\alpha$-isopropylacrylonitile. One or more of the above monovinylidene monomers may be used as a comonomer in making the ethylene copolymers for use in the invention.

The laminates of the invention can be prepared by placing a layer of an irradiated, heat shinkable, thermoplastic material having a thickness of from about 0.5 mil to about 100 mils and preferably from about 5 mils to about 50 mils, between two glass plates, subjecting the lay-up to a temperature of from about 300° F. to about 400° F. and preferably from about 325° F. to about 350° F. and pressures of from about 100 p.s.i. to about 200 p.s.i. and preferably from about 150 p.s.i. to about 175 p.s.i. for a period of from about 3 to about 10 minutes. The laminate is colled while under pressure and the pressure is then released.

The layer of thermoplastic material may be made up of multiple sheets of individual films, each having a thickness of from about 0.5 mil to about 10 mils and preferably from about 1 mil to 6 mils. Where clarity is important and the thickness of the thermoplastic material is from about 10 to 100 mils it is necessary that multiple sheets of thin films be used.

It has been found that through the use of the particular irradiated, heat shrinkable, thermoplastic materials that have been described, thinner films may be employed than those currently used in the art yet obtain laminated glass products having substantially the same desirable properties. Where thin shrink films are emloyed, it has been found that, during the fabrication process, the film shrinks and forces out the air bubbles that are entrapped between the glass plates and shrink film. Therefore, thicker films are not necessary to eliminate entrapped air bubbles. It has also been found that the above-described shrink films may be employed in multiple layers between glass plates to produce the laminates of the invention. It has been observed that, although such multiple layers appear to be nearly opaque when initially placed between glass plates before lamination, after subjecting the assembly to heat and pressure, the resulting laminated product is clear and transparent.

PREPARATION OF FILMS

The films employed in the following examples are prepared by extruding the particular polymeric material at a temperature of from about 284° F. to about 392° F. through an annular die of a conventional extruder to form a polymer tubing. The tubing, after extrusion from the die, is cooled to prevent the polymer from flowing and the cooled tubing is fed directly to an irradiation zone where the irradiation is carried out at a temperature of from room temperature to about 194° F. The irradiation is accomplished by subjecting the polymer tubing to the beam of an electron generator which is operated at a beam current of 5.0 milliamperes and 1.04 million electron volts which is equivalent to a total dose of about 8 megarads. The irradiated tubing is heated to a temperature of from about 212° F. to about 248° F. and is oriented at that temperature by blowing the tubing to a size of about 2 to about 10 times the original diameter by means of air pressure. The blown tubing is also stretched in the longitudinal direction by means of tension produced by driven rollers at a draw-down ratio of about 4.2. The resulting biaxially oriented irradiated tubing is cooled to room temperature while the air pressure and tension of the rollers are maintained and the tubing is collapsed and collected. Suitable size samples were prepared for use in the following examples.

PROCEDURE PREPARATION OF LAMINATED GLASS STRUCTURES

To demonstrate the preparation of laminated structures, a copolymer layer of desired thickness having dimensions slightly larger than the glass plate is placed on one side of a 6" x 6" x ⅛" square of plate glass and a second square of plate glass having the same dimensions is placed over the copolymer layer. The sample is placed in a hydraulic press, the platens of which are heated to a temperature of 300° F. The face of each platen is covered with a layer of asbestos ¹⁄₁₆" thick to protect the glass surface. Pressure is slowly applied to the sample until a pressure of 167 p.s.i. is obtained. The heat and pressure are maintained for a period of 7 minutes after which the temperature is slowly lowered to 150° F. over a period of about 3 minutes. The pressure is released and the resulting laminated product is cooled to room temperature.

PROCEDURE FOR TESTING LAMINATES

A wooden box measuring 14" x 14" x 14" has a 5 x 5-inch square section cut from one side. Two 14-inch square metal plates are fastened over the opening in the box, the metal plates also having a 5 x 5-inch square opening to coincide with the opening in the box. One plate is securely fastened to the side of the box and the other plate is held down by studs and wing-nuts located at each corner of the plate. The inner facing surfaces of the plates are covered with a rubber layer to protect the glass laminates which are secured between the plates. The box has several 1-inch holes drilled in the other sides to prevent compression of air in the box during the testing procedure. A steel ball weighing about 4 pounds is dropped from a height of about 6 feet onto the surface of the laminate glass structure, the laminate being securely fastened over the opening of the box and between the metal plates. A laminate is considered to have satisfactory properties if a hole through the laminate or a tear in the plastic material is not greater than 1½ inch in length and also if most of the glass is still adhered to the plastic material.

The following examples are illustrative of the invention and are not intended to limit the scope thereof. All percentages are by weight unless otherwise specified.

Example 1

A copolymer of ethylene and 15 percent by weight vinyl acetate was made into a shrink film, fabricated into a laminate structure and tested in accoradnce with the procedures as described above. The thickness of the copolymer interlayer employed in the laminate was 12 mils. It was prepared by placing together 8 individual films 1.5 mils thick to form the 12-mil interlayer. During the formation of the laminated product, the multiple layers of film adhered to each other and also to the glass plates to produce a resulting laminate product which was transparent and had no distortions or air pockets. The test results showed that the steel ball did not penetrate the laminated glass structure and that good bonding was observed between the copolymer and adjacent glass surfaces, i.e. most of the broken glass pieces remained adhered to the copolymer interlayer of ethylene and vinyl acetate.

Example 2

The procedure of Example 1 was substantially repeated except that the copolymer contained 10 percent by weight vinyl acetate. The test results showed that the steel ball did not penetrate the laminate, no tears were observed in the interlayer and most of the broken glass pieces remained adhered to the copolymer interlayer.

In a comparative test, the procedure of Example 1 was substantially repeated except that the copolymer contained 24 percent by weight vinyl acetate, the thickness of the interlayer employed was 4.5 mils and the film was non-irradiated. The test results showed that the resulting laminate product had a frosty appearance due to the many air bubbles retained during the fabrication process. It was also observed that the steel ball penetrated the laminate beyond the point of failure and, further, that there was poor bonding between the copolymer and glass surface.

In place of the particular irradiated, heat shrinkable copolymer material employed in the construction of the laminates of the foregoing examples, other irradiated, heat shrinkable copolymer materials may be employed, as hereinbefore described, to obtain substantially the same results.

What is claimed is:
1. A laminated product comprising a plurality of solid glass sheets adhered together through an interlayer of an irradiated, heat shrinkable, thermoplastic material, said interlayer comprising a copolymer of ethylene and from about one to about 45 percent by weight of at least one monovinylidene monomer selected from the group consisting of vinyl esters of lower alkanoic monobasic acids, lower alkyl esters of $\alpha,\beta$-ethylenically unsaturated monocarboxylic acids, and $\alpha,\beta$-ethylenically unsaturated monocarboxylic acids.

2. The laminate according to claim 1 wherein the interlayer of irradiated, heat shrinkable thermoplastic material comprises a copolymer of ethylene and vinyl acetate.

3. The laminate according to claim 2 wherein the interlayer comprises multiple layers of film of the copolymer composition.

4. A method for producing laminated glass articles which comprises the steps of (1) placing between at least two solid glass surfaces an interlayer of an irradiated, heat shrinkable thermoplastic material, said interlayer comprising a copolymer of ethylene and from about one to about 45 percent by weight of at least one monovinylidene monomer selected from the group consisting of vinyl esters of lower alkanoic monobasic acids, lower alkyl esters of $\alpha,\beta$-ethylenically unsaturated monocarboxylic acids, and $\alpha,\beta$-ethylenically unsaturated monocarboxylic acids, (2) subjecting the lay-up to heat and pressure, (3) cooling the laminate under pressure and (4) releasing the pressure from the resulting laminated product.

5. The method according to claim 4 wherein the interlayer of irradiated, heat shrinkable thermoplastic material comprises a copolymer of ethylene and vinyl acetate.

6. The method according to claim 4 wherein the lay-up is subjected to temperatures of from about 300° F. to about 400° F. and pressures of from about 100 p.s.i. to about 200 p.s.i.

7. The method according to claim 4 wherein the interlayer has a thickness of from about 0.5 mil to about 100 mils.

References Cited

UNITED STATES PATENTS 2,400,139   5/1946   Roland _____ 161—204
3,239,370   3/1966   Thomson et al. _____ 117—138.8

ROBERT F. BURNETT, Primary Examiner

WILLIAM J. VAN BALEN, Assistant Examiner

U.S. Cl. X.R.

156—106, 327, 332; 161—165, 204, 402, 412; 204—159.14; 264—22